United States Patent
Bopp et al.

(10) Patent No.: US 9,975,471 B2
(45) Date of Patent: May 22, 2018

(54) DRIVER ASSISTANCE SYSTEM

(71) Applicant: Conti Temic Microelectronic GmbH, Nürnberg (DE)

(72) Inventors: Thomas Bopp, Langenau (DE); Frank Gruson, Lindau (DE); Stefan Hegemann, Wangen (DE); Peter van der Vegte, Friedrichshafen (NL)

(73) Assignee: Conti Temic microelectronic GmbH, Nürnberg (DE)

( * ) Notice: Subject to any disclaimer, the term of this patent is extended or adjusted under 35 U.S.C. 154(b) by 0 days. days.

(21) Appl. No.: 15/113,276

(22) PCT Filed: Jan. 20, 2015

(86) PCT No.: PCT/DE2015/200007
§ 371 (c)(1),
(2) Date: Jul. 21, 2016

(87) PCT Pub. No.: WO2015/117604
PCT Pub. Date: Aug. 13, 2015

(65) Prior Publication Data
US 2017/0008444 A1   Jan. 12, 2017

(30) Foreign Application Priority Data

Feb. 6, 2014   (DE) ......................... 10 2014 202 133
Mar. 14, 2014  (DE) ......................... 10 2014 204 770

(51) Int. Cl.
*B60Q 1/26*   (2006.01)
*B60Q 1/08*   (2006.01)
(Continued)

(52) U.S. Cl.
CPC ............. *B60Q 1/085* (2013.01); *B60Q 1/143* (2013.01); *B60Q 9/00* (2013.01); *H05B 37/0227* (2013.01);
(Continued)

(58) Field of Classification Search
CPC ........ B60Q 1/44; B60Q 1/143; B60Q 1/1423; B60Q 9/001; B60Q 2300/112;
(Continued)

(56) References Cited

U.S. PATENT DOCUMENTS 8,723,948 B2  5/2014  Gotz
8,884,522 B2  11/2014 Imaeda
(Continued)

FOREIGN PATENT DOCUMENTS

DE  102007028658  12/2008
DE  102007040042  2/2009
(Continued)

OTHER PUBLICATIONS

German Search Report for German Application No. 10 2014 204 770.6 dated Sep. 4, 2014, including partial translation, 8 pages.
(Continued)

*Primary Examiner* — Minh D A
(74) *Attorney, Agent, or Firm* — RatnerPrestia

(57) ABSTRACT

A driver assistance system for controlling a high beam, including an environment detecting device. At least one radar or lidar sensor system as well as a camera sensor system are provided for detecting the environment in front of the vehicle. A control signal for a high beam controller or warning device is generated when the high beam is active and at least one sensor system for detecting the environment simultaneously detects a potentially dazzled object.

14 Claims, 1 Drawing Sheet

(51) Int. Cl.
*B60Q 1/14* (2006.01)
*B60Q 9/00* (2006.01)
*H05B 37/02* (2006.01)

(52) U.S. Cl.
CPC .. *B60Q 2300/312* (2013.01); *B60Q 2300/336* (2013.01); *B60Q 2300/41* (2013.01); *B60Q 2300/42* (2013.01)

(58) Field of Classification Search
CPC .. B60Q 1/122; B60Q 2300/122; B60Q 1/124; B60Q 1/1415; B60Q 1/18; B60Q 2300/314; B60Q 2300/42; B60Q 3/0293; B60Q 11/005; B60Q 1/387; B60Q 1/2603; B60Q 3/048; F21V 23/02; F21V 25/12; H05B 37/0236; A63J 17/00; F21L 14/026; B60R 16/03; H02K 21/48; B62J 6/001; B62J 6/003; H02J 7/1492
See application file for complete search history.

(56) References Cited

U.S. PATENT DOCUMENTS

| | | | |
|---|---|---|---|
| 9,381,852 | B2 | 7/2016 | Foltin |
| 2010/0091514 | A1* | 4/2010 | Albou ............... B60Q 1/143 362/538 |
| 2012/0229028 | A1 | 9/2012 | Ackermann |
| 2013/0175926 | A1* | 7/2013 | Katsuno ............. B60Q 1/085 315/82 |
| 2013/0335984 | A1 | 12/2013 | Foltin |
| 2014/0015411 | A1* | 1/2014 | Ehlgen ............... B60Q 1/143 315/82 |
| 2014/0085468 | A1 | 3/2014 | Faber |

FOREIGN PATENT DOCUMENTS

| | | |
|---|---|---|
| DE | 102007058637 | 6/2009 |
| DE | 102008014689 | 10/2009 |
| DE | 102009051485 | 6/2010 |
| DE | 102010026672 | 3/2011 |
| DE | 102009054249 | 5/2011 |
| DE | 102009057219 | 5/2011 |
| DE | 102011006554 | 10/2012 |
| DE | 102011006570 | 10/2012 |
| DE | 102012008066 | 1/2013 |
| DE | 102012213276 | 1/2013 |
| DE | 102012203214 | 9/2013 |
| DE | 102012210157 | 12/2013 |
| EP | 2100769 | 9/2009 |
| EP | 2420408 | 2/2012 |
| KR | 20130112116 | 10/2013 |
| WO | 2013021795 | 2/2013 |

OTHER PUBLICATIONS

International Search Report and Written Opinion of the International Searching Authority for International Application No. PCT/DE2015/200007 dated Jun. 9, 2015, 9 pages.
International Preliminary Report on Patentability and Written Opinion of the International Searching Authority for International Application No. PCT/DE2015/200007, dated Aug. 9, 2016, 8 pages.
Chinese Office Action for Chinese Application No. 201580007467.1, dated Feb. 8, 2018 with translation, 11 pages.

* cited by examiner

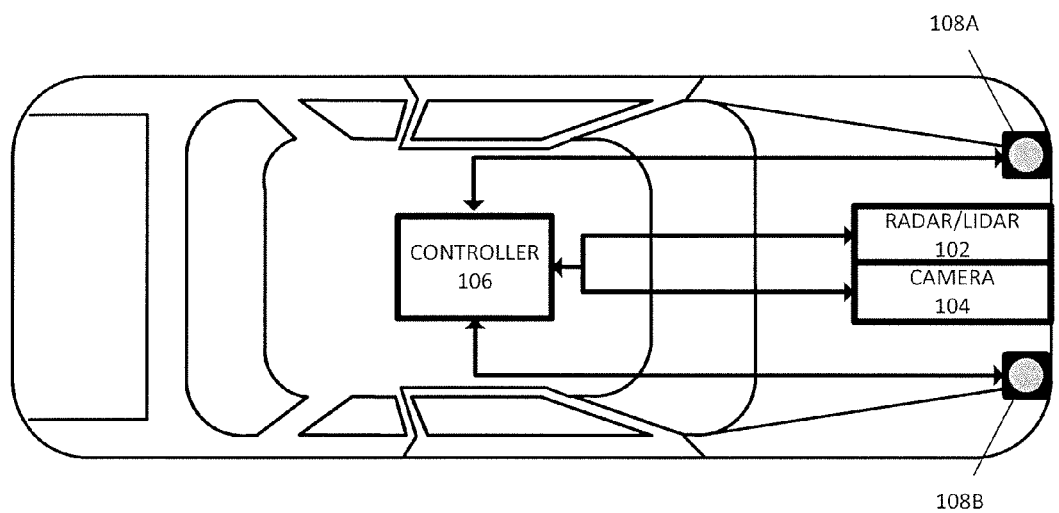

DRIVER ASSISTANCE SYSTEM

CROSS REFERENCE TO RELATED APPLICATIONS

This application is the U.S. National Phase Application of PCT International Application No. PCT/DE2015/200007, filed Jan. 20, 2015, which claims priority to German Patent Application No. 10 2014 202 133.2, filed Feb. 6, 2014 and German Patent Application No. 10 2014 204 770.6, filed Mar. 14, 2014, the contents of such application being incorporated by reference herein.

FIELD OF THE INVENTION

The invention relates to a driver assistance system for controlling a high beam for a vehicle.

BACKGROUND OF THE INVENTION

Motor vehicles are increasingly equipped with driver assistance systems which detect the environment with the aid of sensor systems and, based on the traffic situation thus detected, deduce automatic reactions of the vehicle and/or instruct, in particular warn, the driver. In the process, a distinction is made between comfort and safety functions.

At the present time, FSRA (Full Speed Range Adaptive Cruise Control) is the most important function in the area of comfort functions. The vehicle regulates its own speed to the desired speed set by the driver, provided that the traffic situation permits this; otherwise the vehicle's speed is automatically adjusted to the traffic situation. At present, autonomous light assistance, in particular autonomous activation of the high beam, is establishing itself as another important comfort function.

The focus of the safety functions is reducing the braking distance in emergency situations. The range of suitable driver assistance functions ranges from a warning, automatic prefilling of the brake in order to reduce braking latency (prefill), an improved braking assistant (BAS+) right up to autonomous emergency braking.

The aforementioned high beam controller is now achieved with camera sensors which detect the lights of vehicles driving ahead or oncoming vehicles. If there is a risk of dazzling other road users detected in this way, the high beam is either switched off or adaptively controlled such that no dazzling occurs.

SUMMARY OF THE INVENTION

An aspect of this invention aims to provide an improved driver assistance system for controlling a high beam which reliably detects other road users and prevents them from being dazzled.

According to an aspect of the invention a driver assistance system for controlling a high beam, comprising environment detecting means is indicated. The means include at least one radar or lidar sensor system as well as a camera sensor system for detecting the environment in front of a vehicle. A control signal for a high beam controller or warning device is generated when the high beam is active and a potentially dazzled object is simultaneously detected by at least one sensor system for detecting the environment.

BRIEF DESCRIPTION OF THE DRAWING

The FIGURE shows a vehicle system according to an embodiment of the present invention.

DETAILED DESCRIPTION OF THE PREFERRED EMBODIMENTS

Objects detected by a radar system are, in particular, moving objects which have a relative speed to the vehicle which is not equal to the vehicle's own speed. The objects may be e.g. vehicles driving ahead or oncoming vehicles, cyclists or pedestrians.

The radar sensor 102 of vehicle 100 is able to measure the relative speed of objects very quickly and very precisely due to its Doppler evaluation system. It is then easy to distinguish between moving and stationary objects (stationary objects are e.g. guardrails, traffic signs, parked vehicles, and bushes and trees at the edge of the road) based on this and the known speed of the vehicle. Of course it is also possible to distinguish between oncoming vehicles and vehicles driving ahead, which does not, however, constitute a fundamental difference for deactivating the high beam.

The camera system 104 of vehicle 100 detects the lights of vehicles driving ahead or oncoming vehicles. For example, a colour camera can be used, in order to reliably detect red taillights and white headlights. Due to the redundant environment detection by various sensor systems, the probability of detecting a potentially dazzled object is increased and, therefore, also the probability of not dazzling any other road user.

In a preferred embodiment of an aspect of the invention, a control signal for controlling a high beam 108A and 108B or a warning is generated by controller 106, when the high beam is active and a potentially dazzled object is simultaneously detected by the radar or lidar sensor system 102 and the camera sensor system 104. This embodiment of the invention prevents an erroneous deactivation of the high beam, because the requirements for detecting a potentially dazzled object are very high in this case. Both sensor systems 102 and 104 have to detect the object for the control signal for controlling the high beam 108A and 108B to be emitted from controller 106.

Another positive embodiment of an aspect of the invention is characterized in that a control signal is generated when the high beam is active and a potentially dazzled moving object is detected by the radar or lidar sensor system 102, but not by the camera sensor system 104. This occurs, in particular, when the lights of an oncoming vehicle are concealed, e.g. in the case of visually separated roadways such as on a highway having bushes on the median or by a guardrail which separates the vehicle's roadway and the roadway of an oncoming vehicle. Furthermore, it is possible for the potentially dazzled object to be located on a traffic circle in front of the vehicle 100 and to have not yet entered the vehicle's lane. A camera sensor system 104 cannot detect the headlights of the potentially dazzled object in this case either.

According to one positive embodiment of an aspect of the invention, if additional, specified environment information is available, a control signal is also generated when a potentially dazzled moving object is only detected by the radar or lidar sensor system 102. In one positive embodiment, the control signal is otherwise only generated when both sensor systems 102 and 104 detect a potentially dazzled object. Environment information can be e.g. fog, poor visibility, elevated development at the road edge or similar information implying that the camera sensor system 104 has restricted visibility or a restricted field of view.

According to another embodiment of an aspect of the invention, at least one sensor system detects a development at the edge of the road. This can be both the radar sensor system 102 and the camera sensor system 104. A development at the edge of the road means, in particular, elevated objects such as guardrails, bushes, a construction site fence or similar which separate roadways from one another, e.g. the median on a highway.

According to another embodiment of an aspect of the invention, a control signal is generated when the high beam 108A and 108B is active and a potentially dazzled object is detected by the radar or lidar sensor system 102, but not by the camera sensor system 104. In addition, an increased development at the edge of the road, which separates roadways from one another, is detected.

In the case of visually separated roadways (e.g. a highway having bushes on the median) there is a risk, as described above, that a camera sensor system 102 does not detect the headlights of an oncoming vehicle on a roadway on the other side of the development at the road edge, since these are concealed. However, the oncoming vehicle can be dazzled if a control signal for a high beam controller 106 is not emitted.

According to a preferred embodiment of an aspect of the invention, means for detecting a traffic circle lying ahead of the vehicle are provided. A traffic circle lying ahead of the vehicle can, for example, be inferred from an electronic map, if the vehicle is equipped with a GPS system. Alternatively or additionally, a camera system for detecting traffic signs or a radio-based system (c2x) for transmitting this information or a special map, which can be updated, for driver assistance systems (E-horizon) can be provided.

According to one positive embodiment of an aspect of the invention, a control signal is generated when the high beam is active and a potentially dazzled object is detected by the radar or lidar sensor system 102, but not by the camera sensor system 104 and, in addition, a traffic circle lying ahead of the vehicle is detected. There is also a risk of dazzling the object in this case, since the headlights cannot yet be detected by the camera sensor system, if the object is stopped at the traffic circle.

In a preferred embodiment of an aspect of the invention, a driver assistance system includes a radar or lidar sensor system having a controllable range. The data from the radar or lidar sensor system is also used for other driver assistance functions such as e.g. an emergency braking assistant or adaptive cruise control or similar. A high sensor range is selected, if no relevant objects are located in a range which is relevant for another driver assistance function. The result is that the radar or lidar sensor system is able to detect oncoming vehicles, even when they are a great distance away.

According to one particular embodiment of an aspect of the invention, in response to the control signal, a warning is given to the driver using audible, visual or haptic means or the high beam is switched off or the range of the high beam is reduced or the light cone of the high beam is formed in such a manner that the potentially dazzled moving object is omitted in the light cone. Autonomous deactivation of the high beam can also be dispensed with in the case of cyclists and pedestrians, since these can be better detected by the driver at high beam than at low beam; cyclists and pedestrians can be roughly classified with respect to vehicles by means of the level of reflection and the absolute speed.

The invention claimed is:

1. A method for a driver assistance system for controlling a high beam, the driver assistance system comprising i) a radar sensor system or a lidar sensor system, and ii) a camera sensor system for detecting the environment in front of a vehicle, the method comprising:
   generating a control signal for a high beam controller or a warning device when the high beam is active and a potentially dazzled object is:
   1) simultaneously detected by i) the radar sensor system or the lidar sensor system, and ii) the camera sensor system, or
   2) detected by the radar or lidar sensor system, and not detected by the camera sensor system.

2. The method according to claim 1, further comprising:
   generating a control signal when the high beam is active and a potentially dazzled object is simultaneously detected by the radar or lidar sensor system and the camera sensor system.

3. The method according to claim 2, wherein
   if additional, specified environment information is available, a control signal is also generated when a potentially dazzled object is only detected by the radar or lidar sensor system.

4. The method according to claim 1, further comprising:
   generating a control signal when the high beam is active and a potentially dazzled object is detected by the radar or lidar sensor system, but not by the camera sensor system.

5. The method according to claim 4, further comprising:
   generating a control signal when the high beam is active and a potentially dazzled object is detected by the radar or lidar sensor system, but not by the camera sensor system and
   detecting an increased development at the edge of the road.

6. The method according to claim 4, wherein
   a control signal is generated when the high beam is active and a potentially dazzled object is detected by the radar or lidar sensor system, but not by the camera sensor system and
   a traffic circle lying ahead of the vehicle is detected.

7. The method according to claim 1,
   wherein if additional, specified environment information is available, a control signal is also generated when a potentially dazzled object is only detected by the radar or lidar sensor system.

8. The method according to claim 1, wherein
   at least one sensor system, for detecting the environment detects a development at the edge of the road.

9. The method according to claim 8, further comprising:
   generating a control signal when the high beam is active and a potentially dazzled object is detected by the radar or lidar sensor system, but not by the camera sensor system and an increased development at the edge of the road is detected.

10. The method according to claim 1, wherein
    means for detecting a traffic circle lying ahead are provided.

11. The method according to claim 10, wherein
    a control signal is generated when the high beam is active and a potentially dazzled object is detected by the radar or lidar sensor system, but not by the camera sensory system and a traffic circle lying ahead of the vehicle is detected.

12. The method according to claim 1, which comprises a radar or lidar sensor system having a controllable range, wherein the radar or lidar sensor system is also used for other driver assistance functions, wherein
a high sensor range is selected, if no relevant objects are located in a range which is relevant for another driver assistance function.

13. The method according to claim 1, wherein in response to the signal, a warning is given to the driver using audible, visual or haptic means or the high beam is switched off or the range of the high beam is reduced or the light cone of the high beam is formed in such a manner that the potentially dazzled moving object is omitted in the light cone.

14. A driver assistance system for controlling a high beam of a vehicle comprising:
   i) a radar sensor or a lidar sensor system, and ii) a camera sensor system for detecting the environment in front of a vehicle, and
   a control unit configured to generate a control signal for a high beam controller or a warning device when the high beam is active and a potentially dazzled object is:
      1) simultaneously detected by i) the radar sensor system or the lidar sensor system, and ii) the camera sensor system, or
      2) detected by the radar or lidar sensor system, and not detected by the camera sensor system.

* * * * *